(12) United States Patent
Murooka et al.

(10) Patent No.: US 8,094,217 B2
(45) Date of Patent: Jan. 10, 2012

(54) IMAGE CAPTURING APPARATUS AND IMAGE CAPTURING METHOD

(75) Inventors: Takashi Murooka, Kanagawa (JP); Hideyasu Ishibashi, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 464 days.

(21) Appl. No.: 12/415,293

(22) Filed: Mar. 31, 2009

(65) Prior Publication Data

US 2009/0244339 A1    Oct. 1, 2009

(30) Foreign Application Priority Data

Mar. 31, 2008  (JP) ................................. 2008-093409

(51) Int. Cl.
*H04N 5/235* (2006.01)
*H04N 9/04* (2006.01)
*A62B 1/04* (2006.01)

(52) U.S. Cl. .......................... 348/272; 348/276; 348/65

(58) Field of Classification Search .................... 348/61, 348/65, 272, 275, 276, 277
See application file for complete search history.

(56) References Cited

U.S. PATENT DOCUMENTS

| 5,557,324 A | 9/1996 | Wolff | |
|---|---|---|---|
| 2009/0244537 A1 * | 10/2009 | Murooka et al. | 356/364 |

FOREIGN PATENT DOCUMENTS

| JP | 8-503313 A | 4/1996 |
|---|---|---|
| JP | 11-019026 A | 1/1999 |
| JP | 2004-518312 A | 6/2004 |
| WO | WO 02/05208 A2 | 1/2002 |

OTHER PUBLICATIONS

Office Action, dated Nov. 8, 2011, issued in corresponding JP Application No. 2008-093409, 3 pages in English and Japanese.

* cited by examiner

*Primary Examiner* — David N Spector
(74) *Attorney, Agent, or Firm* — Sughrue Mion, PLLC

(57) ABSTRACT

Provided is an image capturing apparatus comprising a plurality of first light receiving elements that are arranged on substantially the same plane and that each receive light of a first color component from a subject; a plurality of second light receiving elements that are arranged on substantially the same plane and with a higher surface density than the plurality of first light receiving elements, and that each receive light of a second color component from the subject; and a polarizing section that blocks polarized light components from the subject except for a first polarized light component so that first-polarized-light receiving elements, which are a portion of the plurality of second light receiving elements, receive the first polarized light component from the subject, the first-polarized-light receiving elements transmitting the light from the subject to be received by the plurality of first light receiving elements.

25 Claims, 11 Drawing Sheets

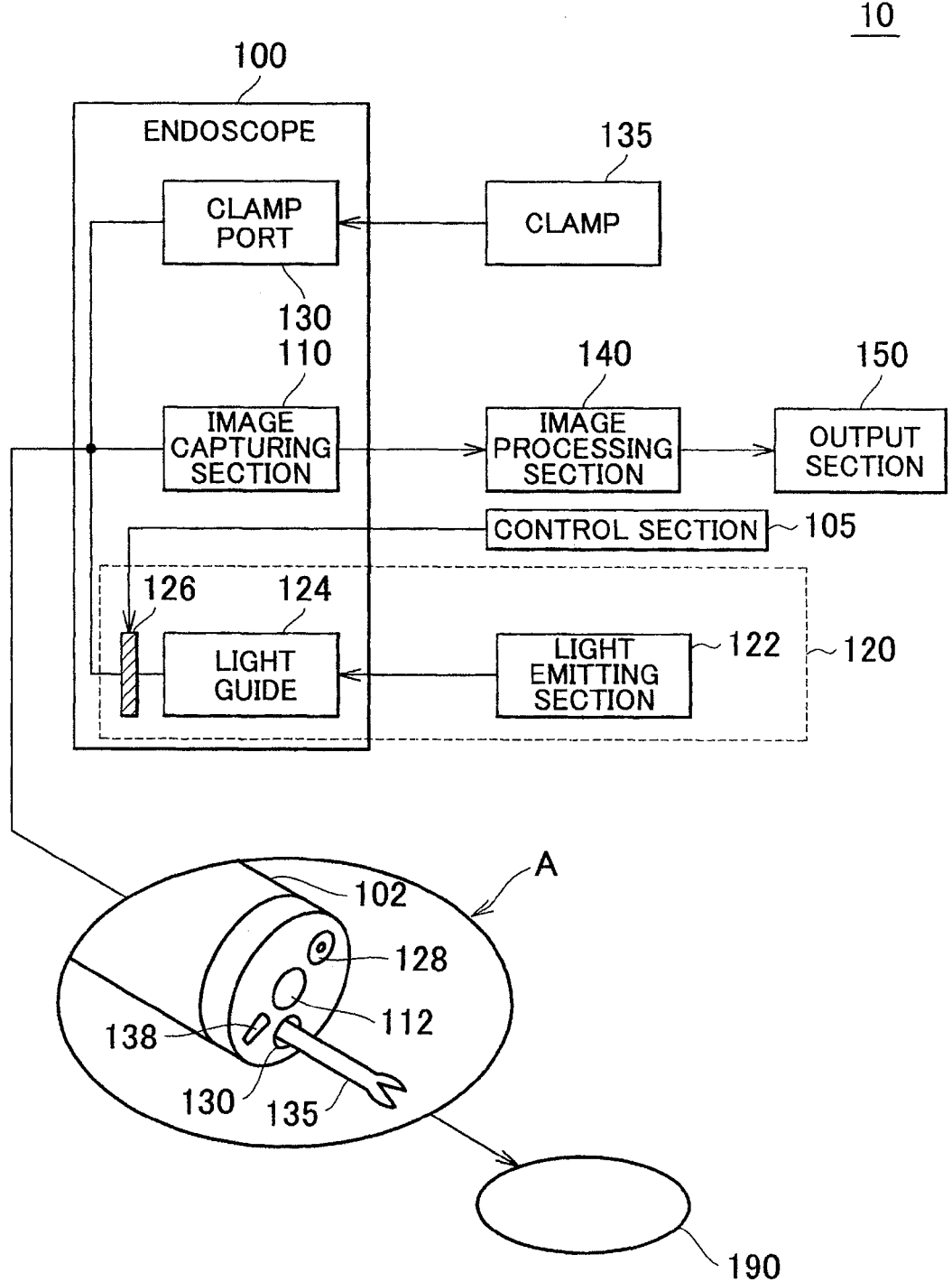
F I G. 1

| POLARIZATION DEGREE | THICKNESS |
|---|---|
| P1 | D1 |
| P2 | D2 |
| ⋮ | ⋮ |

FIG.9

IMAGE CAPTURING APPARATUS AND IMAGE CAPTURING METHOD

CROSS REFERENCE TO RELATED APPLICATION

The present application claims priority from a Japanese Patent Application No. 2008-093409 filed on Mar. 31, 2008, the contents of which are incorporated herein by reference.

BACKGROUND

1. Technical Field

The present invention relates to an image capturing apparatus and an image capturing method. In particular, the present invention relates to an image capturing apparatus and an image capturing method for capturing an image.

2. Related Art

A polarized light viewer that forms a sinusoidal wave of transmitted light to create an image based on polarized information relating to sheen is known as in, for example, Japanese Unexamined Patent Application Publication No. 8-503313.

This polarized light viewer, however, includes image capturing elements for capturing each color light that are arranged with uniform density, and therefore cannot acquire polarized light information with image capturing elements arranged with a high density. Therefore, the polarized light viewer cannot obtain polarized light information with a high resolution.

SUMMARY

Therefore, it is an object of an aspect of the innovations herein to provide an image capturing apparatus and an image capturing method, which are capable of overcoming the above drawbacks accompanying the related art. The above and other objects can be achieved by combinations described in the independent claims. The dependent claims define further advantageous and exemplary combinations of the innovations herein.

According to a first aspect related to the innovations herein, one exemplary image capturing apparatus may comprise a plurality of first light receiving elements that are arranged on substantially the same plane and that each receive light of a first color component from a subject; a plurality of second light receiving elements that are arranged on substantially the same plane and with a higher surface density than the plurality of first light receiving elements, and that each receive light of a second color component from the subject; and a polarizing section that (i) blocks polarized light components from the subject except for a first polarized light component so that first-polarized-light receiving elements, which are a portion of the plurality of second light receiving elements, receive the first polarized light component from the subject, and (ii) transmits the light from the subject to be received by the plurality of first light receiving elements.

According to a second aspect related to the innovations herein, another exemplary image capturing apparatus may comprise a plurality of first light receiving elements that are arranged on substantially the same plane and that each receive light of a first color component from a subject; a plurality of second light receiving elements that are arranged on substantially the same plane and that each receive light of a second color component from the subject, the second color component having an optical intensity greater than that of the first color component; and a polarizing section that blocks polarized light components from the subject except for a first polarized light component so that first-polarized-light receiving elements, which are a portion of the plurality of second light receiving elements, receive the first polarized light component from the subject.

According to a third aspect related to the innovations herein, another exemplary image capturing apparatus may comprise a plurality of first light receiving elements that are arranged on substantially the same plane and that each receive light of a first color component from a subject; a plurality of second light receiving elements that are arranged on substantially the same plane and that each receive light of a second color component from the subject; and a polarizing section that blocks polarized light components from the subject except for a first polarized light component so that first-polarized-light receiving elements, which are a portion of the plurality of second light receiving elements, receive the first polarized light component from the subject.

According to a fourth aspect related to the innovations herein, one exemplary image capturing method may comprise receiving light of a first color component from a subject using a plurality of first light receiving elements arranged on substantially the same plane; receiving light of a second color component from a subject using a plurality of second light receiving elements arranged on substantially the same plane; and blocking polarized light components from the subject except for a first polarized light component, so that the first polarized light component from the subject is received by first-polarized-light receiving elements, which are a portion of the plurality of second light receiving elements.

The summary clause does not necessarily describe all necessary features of the embodiments of the present invention. The present invention may also be a sub-combination of the features described above. The above and other features and advantages of the present invention will become more apparent from the following description of the embodiments taken in conjunction with the accompanying drawings.

BRIEF DESCRIPTION OF THE DRAWINGS

FIG. 1 shows an exemplary configuration of an optical system 10 according to the present embodiment, along with an organism 190.

FIG. 9 is an exemplary table showing thickness information stored by the thickness calculating section 460.

DESCRIPTION OF EXEMPLARY EMBODIMENTS

Figure 2:
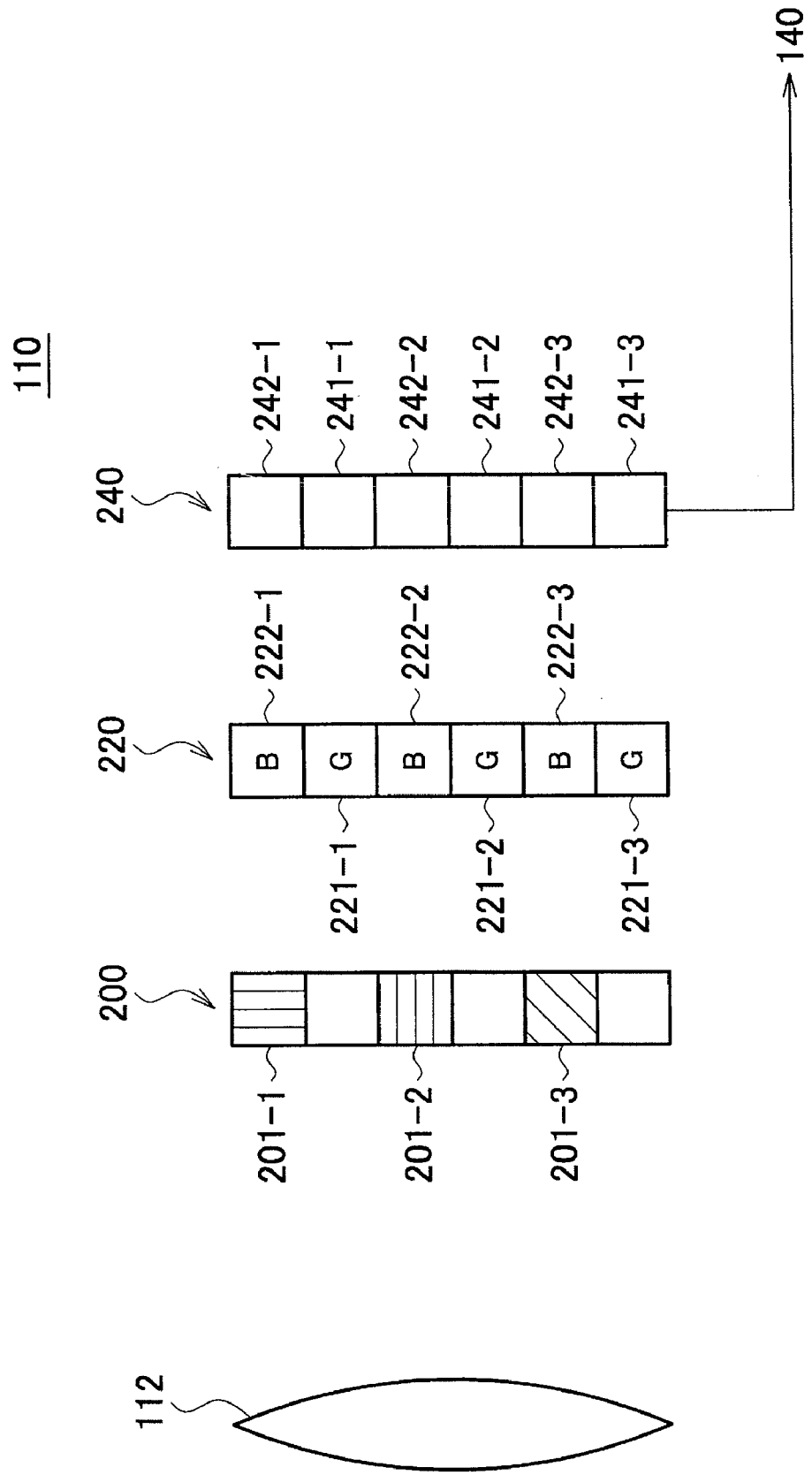
FIG. 2 shows an exemplary configuration of the image capturing section 110.

Hereinafter, some embodiments of the present invention will be described. The embodiments do not limit the invention according to the claims, and all the combinations of the features described in the embodiments are not necessarily essential to means provided by aspects of the invention.

FIG. 1 shows an exemplary configuration of an optical system 10 according to the present embodiment, along with an organism 190. The optical system 10 is provided with an endoscope 100, which is an example of an image capturing apparatus, a clamp 135, an image processing section 140, which is an example of an image processing apparatus, a control section 105, a light radiating section 120, and an output section 150. In FIG. 1, the section "A" is an enlarged view of the tip 102 of the endoscope 100. As described hereinafter, the optical system 10 can function as an image capturing system or an image processing system. The organism 190 is an example of a subject in this invention. The endoscope 100 may house the light radiating section 120.

The endoscope 100 includes an image capturing section 110, a clamp port 130, and a light radiating section 120. The light radiating section 120 includes a light guide 124 and a polarization filter 126. The tip 102 of the endoscope 100 includes a nozzle 138, a lens 112 that is a portion of the image capturing section 110, and an irradiation aperture 128 that is a portion of the light guide 124. The polarization filter 126 and the light guide 124 included in the endoscope 100 and the light emitting section 122 provided outside of the endoscope 100 function as the light radiating section 120.

A clamp 135 is inserted into the clamp port 130, and the clamp port 130 guides the clamp 135 to the tip 102. The tip of the clamp 135 may be any shape. Instead of the clamp, various types of instruments for treating the organism 190 can be inserted into the clamp port 130. The nozzle 138 ejects water or air.

The light emitting section 122 generates irradiation light that passes through the irradiation aperture 128 to the organism 190. The light generated by the light emitting section 122 may be light that includes a red component, a green component, and a blue component.

The light guide 124 may be formed of optical fiber. The light guide 124 guides the light emitted by the light emitting section 122 to the irradiation aperture 128 on the tip 102 of the endoscope 100. The light guide 124 may be provided with a polarization filter 126 that polarizes the light generated by the light emitting section 122, at a position near the irradiation aperture 128. The light generated by the light emitting section 122 and transmitted by the polarization filter 126 passes through the irradiation aperture 128 to irradiate the organism 190.

The control section 105 can insert the polarization filter 126 into the path of the light irradiating the organism 190 at any timing. The polarization filter 126 may be formed as a portion of a rotating filter, and the control section 105 may control the rotation of the rotating filter.

The image capturing section 110 receives light from the organism 190 to capture an image of the organism 190. More specifically, the image capturing section 110 captures an image of the organism 190 using (i) light from the irradiation aperture 128 that is reflected from the organism 190 and (ii) light from the irradiation aperture 128 that is reflected or scattered inside the organism 190.

The image processing section 140 processes an image signal obtained by the image capturing section 110 to generate a variety of images. The image processing section 140 supplies the generated images to the output section 150. The output section 150 outputs the images received from the image processing section 140. The output section 150 may display the images received from the image processing section 140. Instead, the output section 150 may record the images received from the image processing section 140 on a recording medium such as a nonvolatile memory.

FIG. 2 shows an exemplary configuration of the image capturing section 110. The image capturing section 110 includes a lens 112, a polarization filter 200, a color filter 220, and a light receiving section 240. The lens 112 focuses the light from the subject to pass through the polarization filter 200 and the color filter 220 and form an image at the light receiving section 240. The polarization filter 200 is an example of a polarizing section in the present invention.

The polarization filter 200 includes a plurality of polarizing elements 201-1 to 201-3 (hereinafter referred to collectively as the "polarizing elements 201"). The color filter 220 includes a plurality of first color filter sections 221-1 to 221-3 (hereinafter referred to collectively as the "first color filter sections 221") and a plurality of second color filter sections 222-1 to 222-3 (hereinafter referred to collectively as the "second color filter sections 222"). The light receiving section 240 includes a plurality of first light receiving elements 241-1 to 241-3 (hereinafter referred to collectively as the "first light receiving elements 241") and a plurality of second light receiving elements 242-1 to 242-3 (hereinafter referred to collectively as the "second light receiving elements 242").

The first color filter sections 221 transmit green component light. The second color filter sections 222 transmits blue component light.

The polarizing elements 201 guide polarized light to the color filter 220 by selectively transmitting a prescribed polarized component of the light from the organism 190. The respective transmission axes of the polarizing element 201-1, the polarizing element 201-2, and the polarizing element 201-3 are arranged to have different orientations.

The light from the organism 190 transmitted by the polarizing elements 201 is then transmitted by the second color filter sections 222 to be received by the second light receiving elements 242. Therefore, the second light receiving elements 242 receive the blue component light from the organism 190. As shown in FIG. 2, a polarizing element is not provided between the polarizing element 201-1 and the polarizing element 201-2. The light passing through this region is transmitted by the color filter sections 221 to be received by the first light receiving elements 241. Therefore, the first light receiving elements 241 receive the green component light from the organism 190.

The first light receiving elements 241 and second light receiving elements 242 in the light receiving section 240 each generate a received light signal according to the amount of light received. These received light signals are supplied to the image processing section 140 as an image signal to be processed by the image processing section 140.

Figure 3:
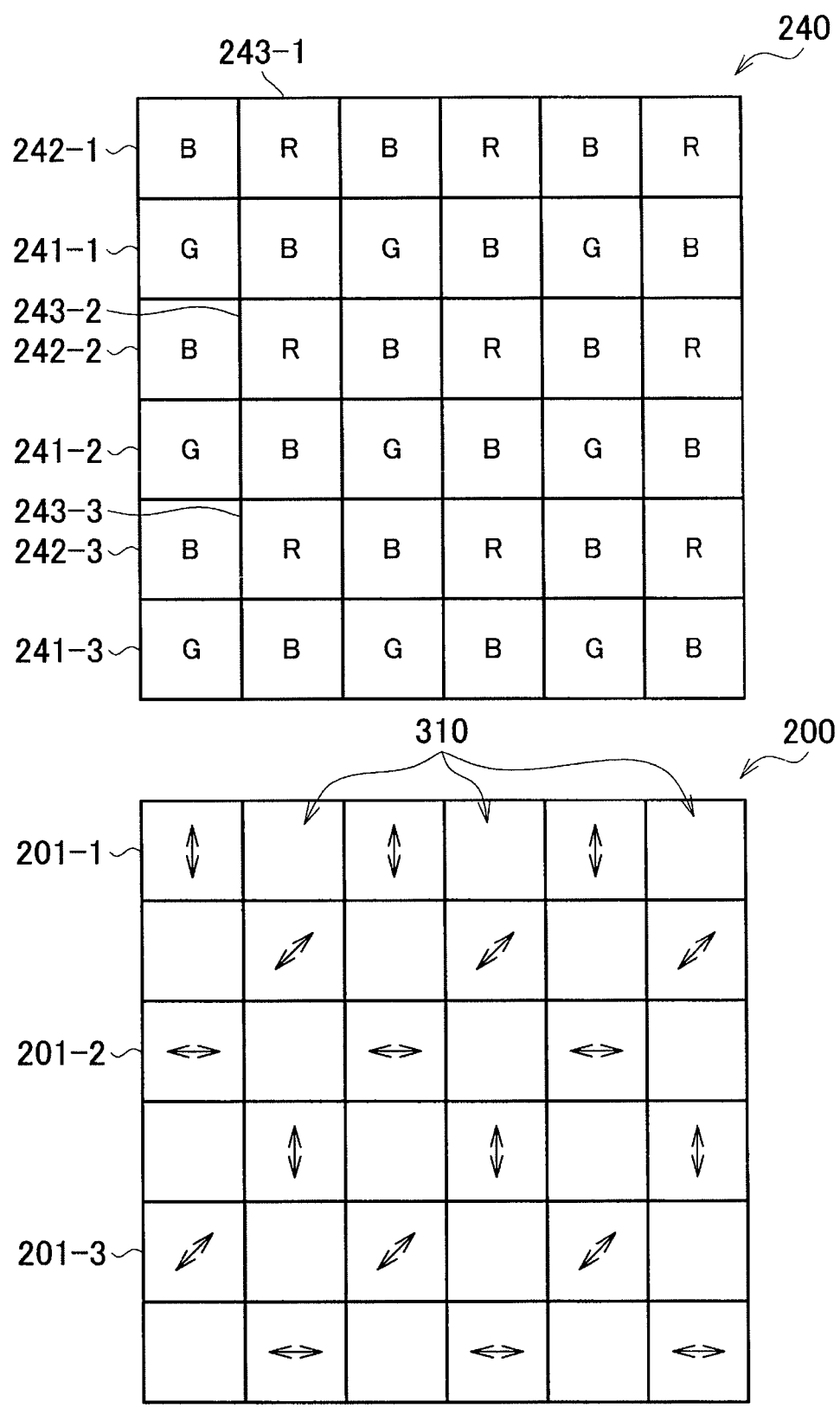
FIG. 3 shows exemplary arrangements of the light receiving elements in the light receiving section 240 and the polarizing elements in the polarization filter 200.

FIG. 3 shows exemplary arrangements of the light receiving elements in the light receiving section 240 and the polarizing elements in the polarization filter 200. The light receiving section 240 includes a plurality of third light receiving elements 243-1 to 243-3 (hereinafter referred to collectively as the "third light receiving elements 243") that receive red component light, in addition to the plurality of first light receiving elements 241 and the plurality of second light receiving elements 242 described above.

In the light receiving section 240, the first light receiving elements 241 are formed in the regions labeled with a "G," the second light receiving elements 242 are formed in the regions labeled with a "B," and the light receiving elements 243 are formed in the regions labeled with an "R." In this way, the first light receiving elements 241, the second light receiving elements 242, and the third light receiving elements 243 are formed in a matrix arrangement in the light receiving section 240.

The first light receiving elements 241 are arranged on substantially the same plane and receive light of a first color component from the organism 190. The second light receiving elements 242 receive light of a second color component from the subject. The second light receiving elements 242 are arranged on substantially the same plane, but with a higher density than the first light receiving elements 241. The second light receiving elements 242 are arranged on substantially the same plane, but in greater numbers per unit area or covering a greater surface area than the first light receiving elements 241 and the third light receiving elements 243. The first light receiving elements 241, the second light receiving elements 242, and the third light receiving elements 243 are all arranged on substantially the same plane.

In the polarization filter 200 of FIG. 3, the orientation of each transmission axis of each polarizing element 201 is indicated by an arrow. In this way, the transmission axes of the polarizing elements 201-1, the polarizing elements 201-2, and the polarizing elements 201-3 may each be oriented in a different direction. Accordingly, the polarizing elements 201-1, the polarizing elements 201-2, and the polarizing elements 201-3 selectively transmit light polarized in different directions. In other words, the first polarized light component, the second polarized light component, and the third polarized light component are respectively polarized in different directions.

The polarizing elements 201-1 and the polarizing elements 201-2 are arranged to have transmission axes that are substantially perpendicular to each other. Therefore, the first polarized light component and the second polarized light component are polarized in directions substantially perpendicular to each other. The light polarized in substantially perpendicular directions may be light such as substantially perpendicular linearly polarized light or right-handed/left-handed circularly polarized light, whose polarization state, when expressed as a Poincare sphere, is represented as two points that are symmetric with respect to a source point on the Poincare sphere.

The polarizing elements 201-1, the polarizing elements 201-2, and the polarizing elements 201-3 are arranged on substantially the same plane in this way. The polarizing elements 201-1 are an example of first polarizing elements, the polarizing elements 201-2 are an example of second polarizing elements, and the polarizing elements 201-3 are an example of third polarizing elements. Therefore, in the following description, the first polarizing elements, the second polarizing elements, and the third polarizing elements refer to the polarizing elements 201-1, the polarizing elements 201-2, and the polarizing elements 201-3, respectively.

The polarization filter 200 may block all polarized light components other than the first polarized light component from the organism 190, so that the second light receiving elements 242-1, which are a portion of the second light receiving elements 242, receive the first polarized light component from the organism 190, and then transmit the light from the organism 190 to the plurality of first light receiving elements 241. The polarization filter 200 may block all polarized light components other than the second polarized light component from the organism 190, so that the light receiving elements 242-2, which are a portion of the second light receiving elements 242, receive the second polarized light component from the organism 190. The polarization filter 200 may block all polarized light components other than the third polarized light component from the organism 190, so that the second light receiving elements 242-3, which are a portion of the second light receiving elements 242, receive the third polarized light component from the organism 190.

The second light receiving elements 242-1 are an example of first-polarized-light receiving elements, the light receiving elements 242-2 are an example of second-polarized-light receiving elements, and the light receiving elements 242-3 are an example of third-polarized-light receiving elements. Therefore, in the following description, the plurality of second light receiving elements 242 that receive substantially the same polarized light component as the second light receiving element 242-1 are referred to collectively as the second light receiving elements 242-1. The plurality of second light receiving elements 242 that receive substantially the same polarized light component as the second light receiving element 242-2 are referred to collectively as the second light receiving elements 242-2. The plurality of second light receiving elements 242 that receive substantially the same polarized light component as the second light receiving element 242-3 are referred to collectively as the second light receiving elements 242-3.

If the light receiving section 240 receives reflected light from the organism 190 when the light radiating section 120 irradiates the organism 190, the polarization filter 200 causes the second light receiving elements 242-1 to receive the first polarized component of the reflected light, causes the second light receiving elements 242-2 to receive the second polarized component of the reflected light, and causes the second light receiving elements 242-3 to receive the third polarized component of the reflected light.

More specifically, the polarizing elements 201-1 block all light other than the first polarized light component of the reflected light, so that each second light receiving element 242-1 receives the first polarized component of the reflected light. The polarizing elements 201-2 block all light other than the second polarized component of the reflected light, so that each second light receiving element 242-2 receives the second polarized component of the reflected light. The polarizing elements 201-3 block all light other than the third polarized component of the reflected light, so that each second light receiving element 242-3 receives the third polarized component of the reflected light. In this way, the polarizing elements 201-1 and the polarizing elements 201-2 are arranged on substantially the same plane as the first light receiving elements 241 and the second light receiving elements 242, but at different positions.

The polarization filter 200 includes a light transmitting section 310. The light transmitting section 310 is not provided with polarizing elements, so that substantially all polarized light components can pass therethrough.

Figure 4:
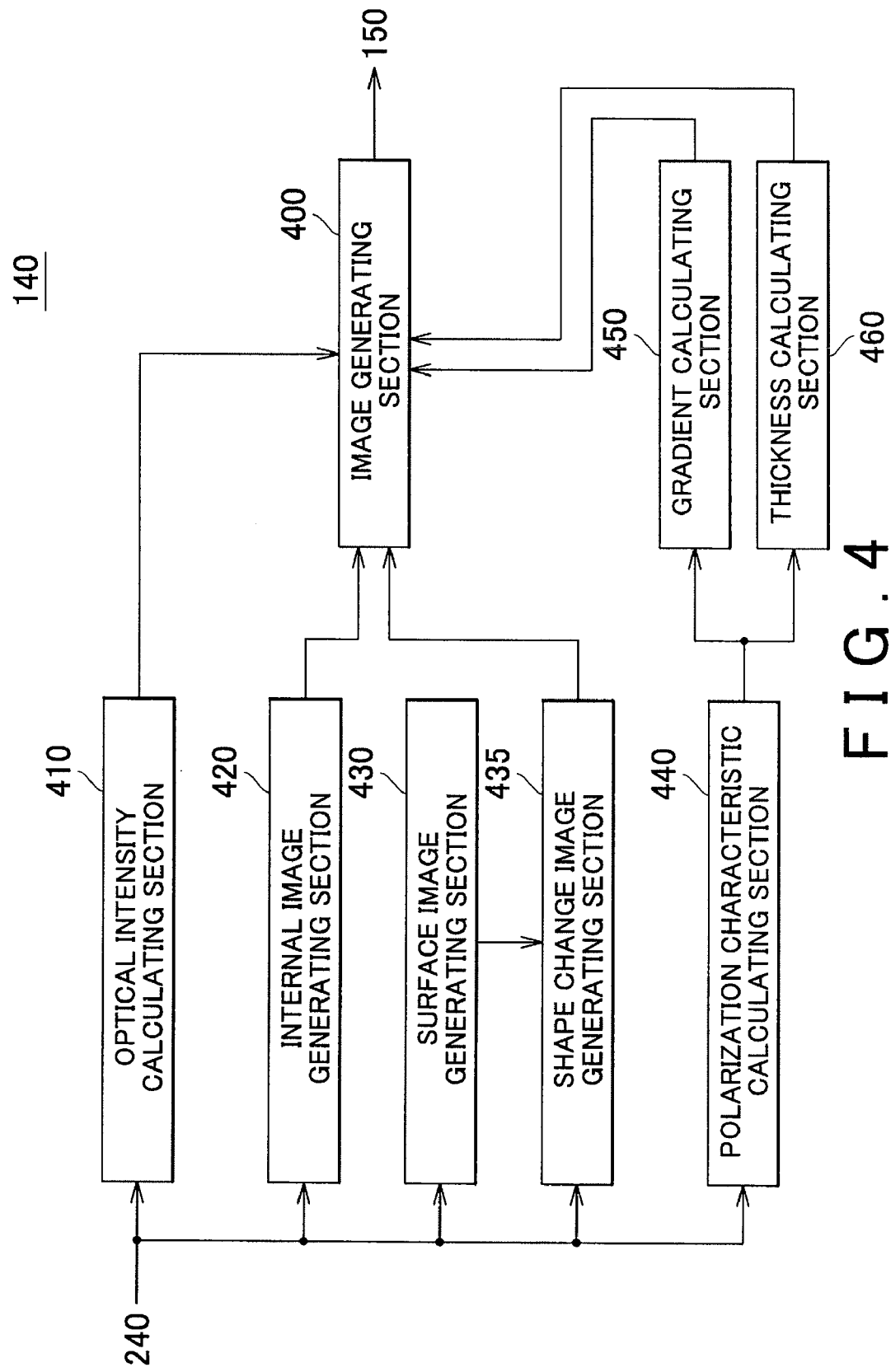
FIG. 4 shows an exemplary block configuration of the image processing section 140.

FIG. 4 shows an exemplary block configuration of the image processing section 140. The image processing section 140 includes an optical intensity calculating section 410, an internal image generating section 420, a surface image generating section 430, an image generating section 400, a shape change image generating section 435, a polarization characteristic calculating section 440, a gradient calculating section 450, and a thickness calculating section 460.

The internal image generating section 420 generates an image of the inside of the organism 190 using the light received by the light receiving section 240. The surface image generating section 430 generates an image of the surface of the organism 190 using the light received by the light receiving section 240.

If the light radiated as the prescribed polarized light by the light radiating section 120 is light polarized in a direction parallel to the transmission axis of any one of the first light receiving elements 241, the second light receiving elements 242, and the third light receiving elements 243, the light receiving section 240 can receive (i) light polarized in the prescribed direction in the reflected light (ii) light polarized in a direction different from the prescribed direction in the reflected light, the reflected light being the light radiated by the light radiating section 120 and reflected from the organism 190. In this case, the surface image generating section 430 generates the surface image based on (i) the light polarized in the prescribed direction received by the light receiving section 240 and (ii) the light polarized in a direction perpendicular to the prescribed direction received by the light receiving section 240.

In this way, when the light radiating section 120 irradiates the organism 190 with the prescribed polarized light component, such as light polarized in the prescribed direction, the light receiving section 240 receives the prescribed polarized light component in the reflected light and a polarized light component that is perpendicular to the prescribed polarization direction in the reflected light. More specifically, the light receiving section 240 receives the polarized light component polarized in the prescribed direction in the reflected light and the polarized light component that is polarized in a direction perpendicular to the prescribed polarization direction in the reflected light.

The surface image generating section 430 generates the surface image based on (i) the prescribed polarized light component received by the light receiving section 240 and (ii) the polarized light component that is perpendicular to the prescribed polarization received by the light receiving section 240. More specifically, the surface image generating section 430 generates the surface image based on (i) the polarized light component polarized in the prescribed direction received by the light receiving section 240 and (ii) the polarized light component that is polarized in a direction perpendicular to the prescribed polarization direction received by the light receiving section 240. The shape change image generating section 435 generates a shape change frame image indicating a shape change of the surface of the organism 190, based on a spatial change component in the surface image. More specifically, the shape change image generating section 435 generates the shape change frame image as a spatial derivative of the surface image.

In this way, the surface image generating section 430 generates the surface image of the organism 190 based on the prescribed polarized light component received by the light receiving section 240 and the polarized light component with a different polarization direction received by the light receiving section 240. The shape change image generating section 435 then generates the shape change frame image based on the generated surface image. In this way, the shape change image generating section 435 can generate the shape change frame image based on the prescribed polarized light component received by the light receiving section 240, i.e. the light polarized in the prescribed direction.

The image generating section 400 generates a composite frame image by superimposing the shape change frame image on an internal frame image, which is an image of the inside of the organism 190, based on the polarized light component received by the light receiving section 240 that differs from the prescribed polarized light component, i.e. the light polarized in a direction different from the prescribed polarization direction. More specifically, the image generating section 400 generates the composite frame image by superimposing the shape change frame image on the internal frame image generated by the internal image generating section 420, based on the polarized light component received by the light receiving section 240 that differs from the prescribed polarized light component. The composite frame image generated by the image generating section 400 is supplied to the output section 150, which displays or stores the composite frame image.

Since the image generating section 400 superimposes the spatial differentiation component of the surface image onto the internal frame image in this way, it may be possible to prevent over-emphasis of the positive reflected light component. Therefore, an endoscope image can be provided that contains sufficient texture information concerning the surface of the organism 190. The image generating section 400 may adjust the brightness component of the internal frame image according to the spatial differential component of the surface image.

As described in relation to FIG. 3, the polarizing elements 201-1 block all polarized light components other than the prescribed polarized light component in the reflected light from the organism 190, so that the plurality of second light receiving elements 242-1 in the light receiving section 240 can receive the specified polarized light component in the reflected light. The polarizing elements 201-2 block all polarized light components other than the polarized light component perpendicular to the prescribed polarized light component in the reflected light from the organism 190, so that the plurality of second light receiving elements 242-2 in the light receiving section 240 can receive the polarized light component perpendicular to specified polarized light component in the reflected light.

In this way, the polarization filter 200 can block all polarized light components other than the prescribed polarized light component in the reflected light from the organism 190 so that the plurality of second light receiving elements 242-1 in the light receiving section 240 can receive the specified polarized light component in the reflected light, and block all polarized light components other than the polarized light component perpendicular to the prescribed polarized light component in the reflected light from the organism 190 so that the plurality of second light receiving elements 242-2 in the light receiving section 240 can receive the polarized light component perpendicular to specified polarized light component in the reflected light. The surface image generating section 430 can then generate the surface image based on (i) the prescribed polarized light component received by the first light receiving elements 241 and (ii) the polarized light component perpendicular to the prescribed polarized light component received by the second light receiving elements 242.

The polarization characteristic calculating section 440 calculates a polarization characteristic of the light from the organism 190, based on the light received by the light receiving section 240. For example, the polarization characteristic calculating section 440 calculates a polarization direction of light from the organism 190 based on the light received by the light receiving section 240. More specifically, the light radiating section 120 irradiates the organism 190 with circularly polarized light that includes a second color component. The polarization characteristic calculating section 440 then calculates the polarization direction of the light from the organism 190 based on (i) the amount of the first polarized light component received by the second light receiving elements 242-1, (ii) the amount of the second polarized light component received by the second light receiving elements 242-2, and (iii) the amount of the third polarized light component received by the second light receiving elements 242-3.

Therefore, when the reflected light from the organism 190 is elliptically polarized light, the polarization characteristic calculating section 440 can calculate the polarization direction of the elliptically polarized light based on the optical intensity of the polarized light components having three different polarization directions that are received by the second light receiving elements 242. The gradient calculating section 450 calculates the gradient of the surface of the organism 190 based on the polarization direction calculated by the polarization characteristic calculating section 440.

In this way, the polarization characteristic calculating section 440 can calculate the polarization characteristic of light from the organism 190 based on (i) the amount of the first polarized light component received by the second light receiving elements 242-1, (ii) the amount of the second polarized light component received by the second light receiving elements 242-2, and (iii) the amount of the third polarized light component received by the second light receiving elements 242-3. The polarization characteristic is not limited to the polarization direction as described above, and may instead be a polarization degree or the like.

As described in relation to FIG. 3, the polarization filter 200 causes the second light receiving elements 242-1 to receive the first polarized light component from the organism 190, causes the second light receiving elements 242-2 to receive the second polarized light component from the organism 190, and causes the second light receiving elements 242-3 to receive the third polarized light component from the organism 190. The polarization characteristic calculating section 440 can then calculate the spatial distribution of the optical characteristic of the light from the organism 190, based on (i) the amount of the first polarized light component received by each of the plurality of second light receiving elements 242-1, (ii) the amount of the second polarized light component received by each of the plurality of second light receiving elements 242-2, and (iii) the amount of the third polarized light component received by each of the plurality of second light receiving elements 242-3. In this way, the polarization characteristic calculating section 440 can calculate a distribution of the polarization degree or a distribution of the gradient of the surface of the organism 190.

The optical intensity calculating section 410 calculates the optical intensity of the second color component from the organism 190, based on the amount of the first polarized light component received by the second light receiving elements 242-1 and the amount of the second polarized light component received by the second light receiving elements 242-2. The image generating section 400 generates an image of the organism 190 based on the spectral intensity calculated by the optical intensity calculating section 410 and the amount of light received by the first light receiving elements 241. In the optical system 10 according to the present embodiment, the second light receiving elements 242 receive the blue component light with different polarizations, but since the optical intensity calculating section 410 can calculate the optical intensity of the blue light component, the optical system 10 can generate a desirable visible light image. Therefore, even more polarizing elements 201 can be allocated to the second light receiving elements 242 to obtain polarization information with a higher resolution.

The optical system 10 can further calculate a thickness of a scattering medium. For example, the organism 190 often contains a material that scatters light. If a lower medium that reflects the polarized light is located beneath a layer of such a scattering material, the polarization characteristic of the reflected light is expected to change according to a change in the thickness of the scattering layer. Therefore, the thickness calculating section 460 calculates the thickness of the scattering layer based on the polarization degree of the reflected light from the organism 190.

More specifically, the light radiating section 120 radiates light to the organism 190 that contains (i) a scattering medium that scatters light and (ii) a lower medium that is located beneath the scattering medium and that reflects back polarized light in response to incident light. The light receiving section 240 receives the light from the lower medium and light radiated by the light radiating section 120 and scattered by the scattering medium. The thickness calculating section 460 calculates the thickness of the scattering medium based on at least one of the polarized light component and the non-polarized light component received by the light receiving section 240. Here, "lower" and "beneath" are not limited to the direction of gravity, and simply refer to a downward direction in the scattering medium as viewed from the light radiating section 120.

If cancer is present in a mucosa of the stomach or the like, the thickness of the membrane layer changes at first according to the type of cancer, how far the cancer has progressed, and the like. Accordingly, there are cases where the optical system 10 can easily identify where cancer is present by using the thickness calculating section 460 to detect the thickness of the mucosa.

Figure 5:
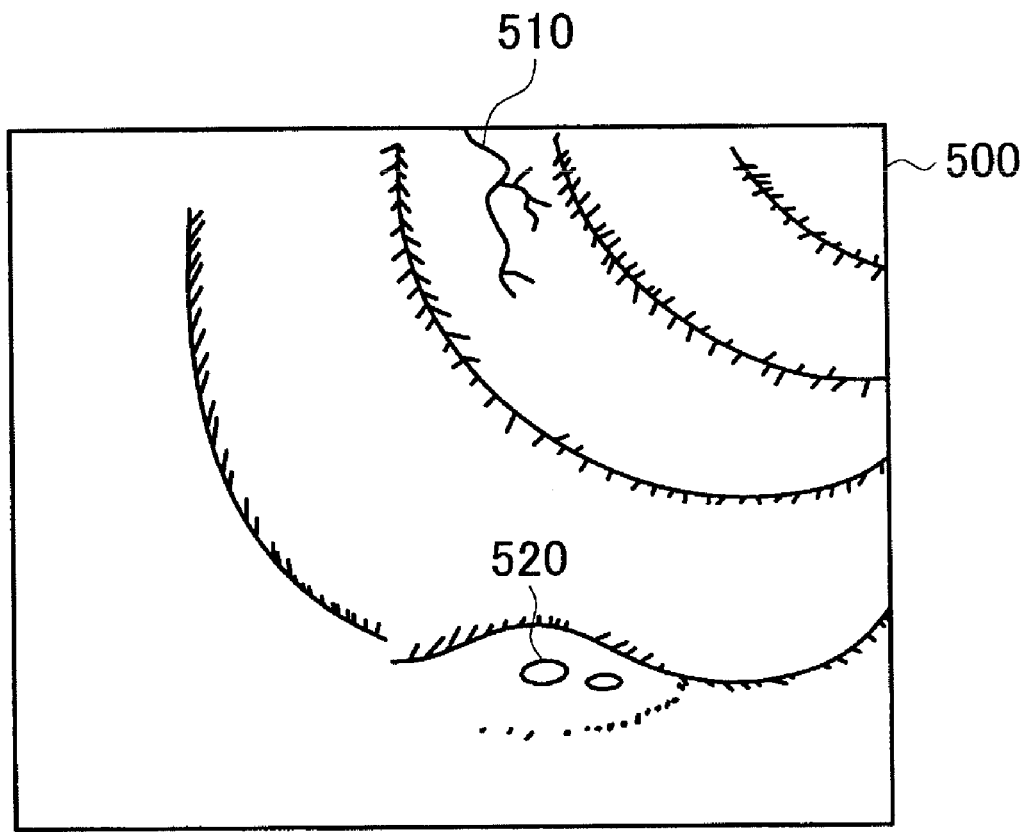
FIG. 5 shows an exemplary frame image 500 obtained by the endoscope 100.

FIG. 5 shows an exemplary frame image 500 obtained by the endoscope 100. The frame image 500 is an example of a frame image that the image capturing section 110 obtains by exposing the light receiving section 240 while the polarization filter 126 is removed from the path of the light. The frame image 500 includes a blood vessel image 510, which is an image of a blood vessel inside the organism 190 serving as the image capturing target, and a direct reflection image 520 formed by the light radiated by the light radiating section 120 and directly reflected from the surface of the organism 190.

The frame image 500 includes general texture information concerning the surface of the organism 190. However, since the frame image 500 includes the direct reflection image 520, the texture information cannot be seen in the region of the direct reflection image 520. For example, a change component indicated by color and detailed texture information for the surface cannot be seen.

Figure 6:
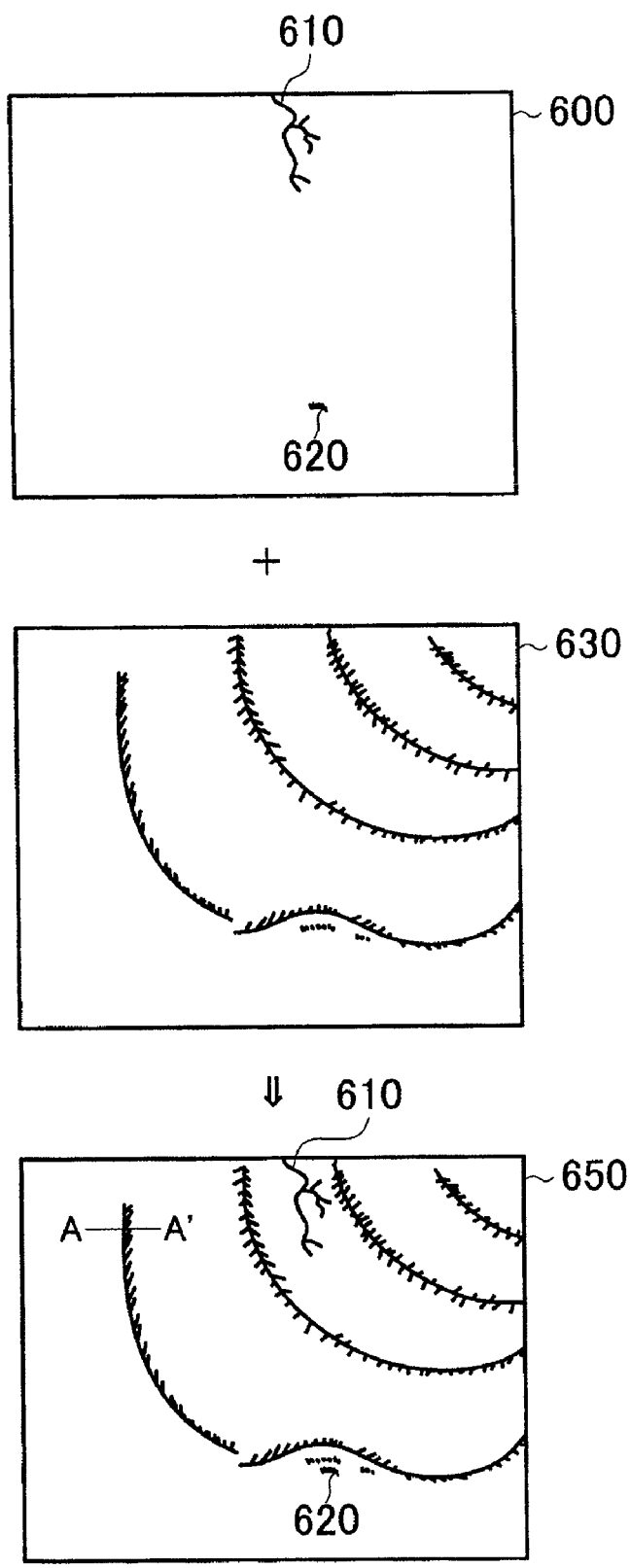
FIG. 6 shows examples of an internal frame image 600, a shape change frame image 630, and a composite frame image 650.

FIG. 6 shows examples of an internal frame image 600, a shape change frame image 630, and a composite frame image 650. The internal image generating section 420 generates the internal frame image 600 based on the light, received by the light receiving section 240, that is polarized in a direction perpendicular to the polarization direction of the light radiated by the light radiating section 120. The internal frame image 600 provides information concerning the inside of the organism 190, and includes a blood vessel image 610 and a pigment change component 620.

The shape change image generating section 435 calculates the shape change frame image 630 as a spatial derivative of the surface image. The spatial differentiation process enables adjustment of the spatial change component of the brightness and weakening of signal intensity of a high-brightness region, such as a directly reflected light. In this way, a shape change frame image 630 can be obtained that has sufficient surface texture information. The image generating section 400 generates the composite frame image 650 by overlapping the internal frame image 600 and the shape change frame image 630 with a prescribed weighting. The composite frame image 650 allows the pigment change component 620 to be seen, which was hidden by the direct reflection image 520 in the frame image 500. Furthermore, since the texture is emphasized, the composite frame image 650 shows that the pigment change component 620 is located on the slope of a convex portion of the surface of the organism 190.

In this way, the optical system 10 can generate an internal frame image 600 that includes surface texture information. Therefore, an observer can view the inside of the organism 190 in association with the surface texture information. In other words, the observer is provided with an image that is easy to see. Furthermore, the optical system 10 superimposes the shape change frame image 630, which is the spatial derivative component of the surface image, onto the internal frame image 600, thereby suppressing the glare caused by the directly reflected light to emphasize the surface texture. The image generating section 400 may convert the shape change frame image 630 and the internal frame image 600 using different LUTs and then combine the resulting images.

Figure 7:
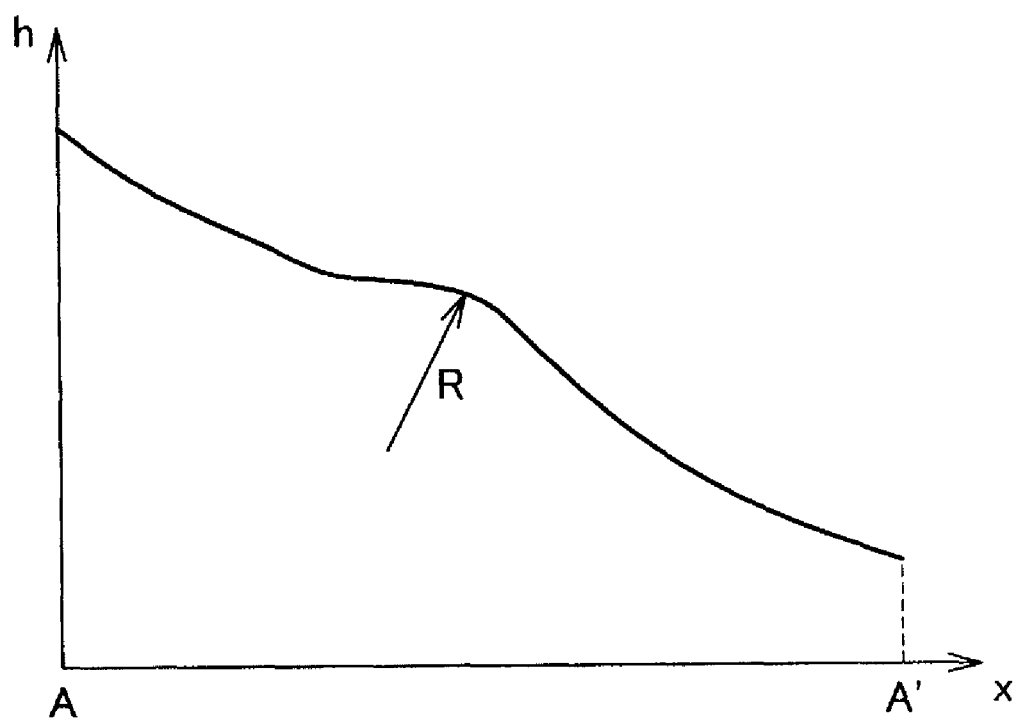
FIG. 7 shows an exemplary gradient.

FIG. 7 shows an exemplary gradient calculation method performed by the gradient calculating section 450. As described above, the gradient calculating section 450 calculates the gradient angle based on the polarization direction calculated by the polarization characteristic calculating section 440. The thickness calculating section 460 may store gradient information concerning the surface of the organism 190 in association with the polarization direction of elliptically polarized light. The thickness calculating section 460 extracts the surface gradient information stored in association with the polarization direction calculated by the polarization characteristic calculating section 440. The surface gradient information can be represented by the curve R of the surface, for example.

The gradient information calculated by the gradient calculating section 450 may be supplied to the image generating section 400. As described above, the polarization characteristic calculating section 440 can calculate a 2-dimensional distribution of the polarization characteristic, and the gradient calculating section 450 can calculate a 2-dimensional distribution of the gradient information in a similar manner. Therefore, the image generating section 400 can generate an image showing the 2-dimensional distribution of the gradient based on the gradient information calculated by the gradient calculating section 450.

Figure 8:
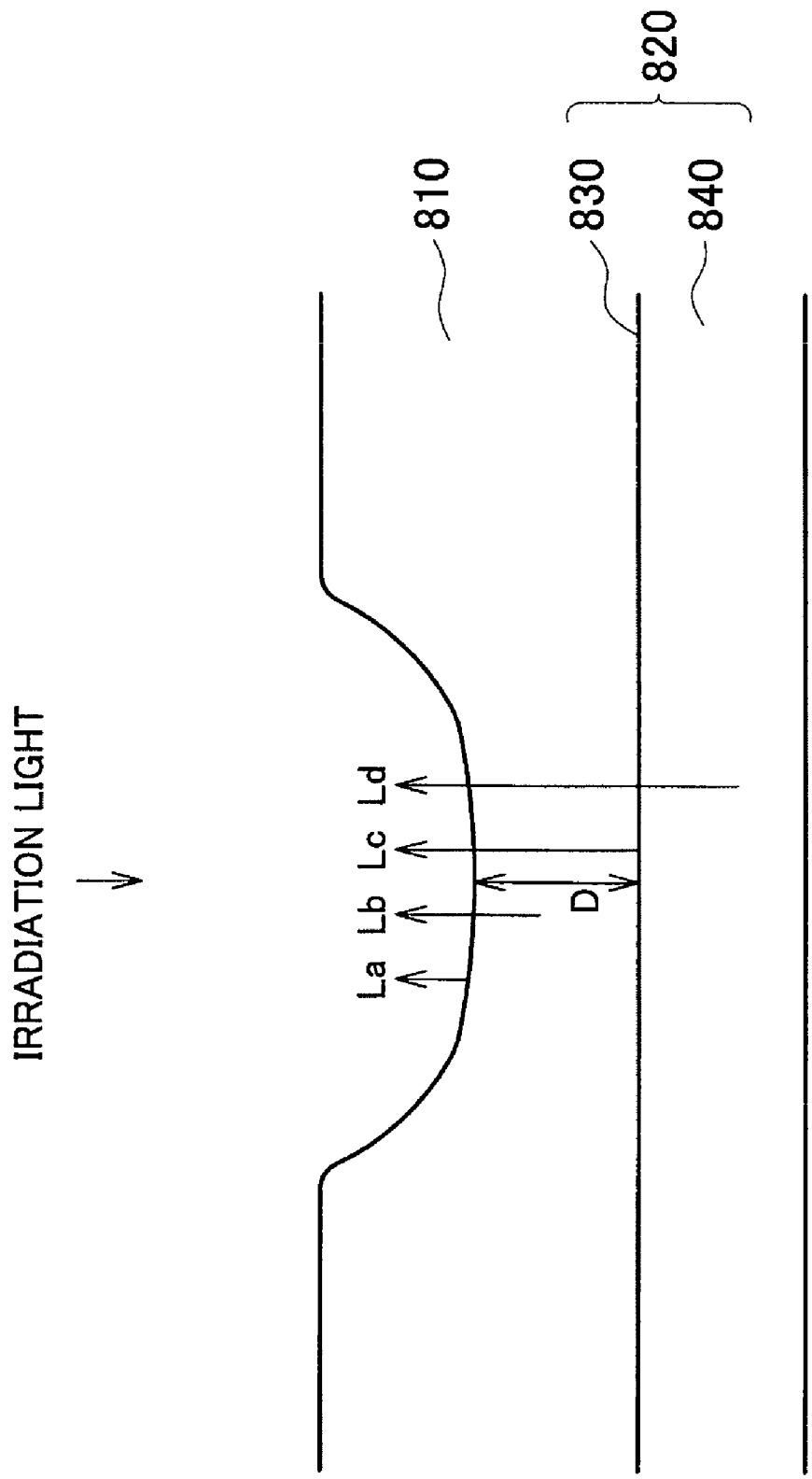
FIG. 8 is a schematic view showing the structure of stomach wall as an example of the organism 190.

FIG. 8 is a schematic view showing the structure of stomach wall as an example of the organism 190. The stomach wall is formed by a mucosa 810, a muscularis mucosae 830, and a submucosal layer 840 layered in the stated order from the surface of the organism 190 downward. When the light radiating section 120 radiates light, the light receiving section 240 receives, as the reflected light, light La reflected from the surface layer of the mucosa 810, light Lb scattered within the mucosa 810, which is an example of the scattering medium, light Lc reflected from a surface of the muscularis mucosae 830, which is an example of the reflective medium, and light Ld reflected from inside the submucosal layer 840 that is polarization anisotropic.

The muscularis mucosae 830 and the submucosal layer 840 reflect non-polarized light in response to the incident irradiation light, as described below, and the lower medium 820 reflects polarized light in response to the incident irradiation light, as described below.

When the light radiating section 120 radiates polarized light, the light La reflected from the surface of the mucosa 810 and the light Lb reflected from the muscularis mucosae 830 become polarized light. The light Ld reflected from the submucosal layer 840, which contains collagen that is polarization anisotropic, also includes a polarized component. On the other hand, the light Lb scattered by the mucosa 810 becomes substantially non-polarized light. Accordingly, the greater the thickness D of the mucosa 810, the closer the reflected light from the organism 190 comes to being non-polarized light.

When the light radiating section 120 radiates non-polarized light, the light La reflected from the surface of the mucosa 810, the light Lb scattered inside the mucosa 810, and the light Lc reflected from the muscularis mucosae 830 are substantially non-polarized light, but the light Ld includes a polarized light component. Accordingly, even when the light radiating section 120 radiates non-polarized light, the greater the thickness D of the mucosa 810, the closer the reflected light from the organism 190 comes to being non-polarized light. Therefore, the thickness calculating section 460 can calculate the thickness of the scattering medium based on the polarization degree of the reflected light received by the light receiving section 240. More specifically, the thickness calculating section 460 calculates a greater thickness of the scattering medium, i.e. the mucosa 810, when the polarization degree of the light received by the light receiving section 240 is smaller.

As described in relation to FIG. 3, the polarization filter 200 selectively transmits a plurality of different polarized light components included in the light from the organism 190, so that each plurality of light receiving elements, i.e. the second light receiving elements 242, in the light receiving section 240 receives a different polarized light component. The polarization characteristic calculating section 440 can calculate the polarization degree based on the amount of light received by each plurality of light receiving elements. The thickness calculating section 460 then calculates a thickness of the scattering medium that is greater when the polarization degree calculated by the polarization characteristic calculating section 440 is smaller.

The light radiating section 120 may irradiate the subject with the prescribed polarized light component. In this case, the light receiving section 240 receives the same prescribed polarized light component that is radiated by the light radiating section 120. The thickness calculating section 460 then calculates a thickness of the scattering medium that is greater when the intensity of the prescribed polarized light component received by the light receiving section 240 is smaller.

As described above, the thickness calculating section 460 calculates a greater thickness of the scattering medium when the polarization degree of the light received by the light receiving section 240 is smaller, regardless of whether the light radiating section 120 irradiates the organism 190 with polarized light or with non-polarized light. Accordingly, the optical system 10 can detect a spatial change in the thickness of the mucosa 810 to detect the decrease in the thickness D of the mucosa 810 that is caused by the progression of some types of cancer.

Figure 9:
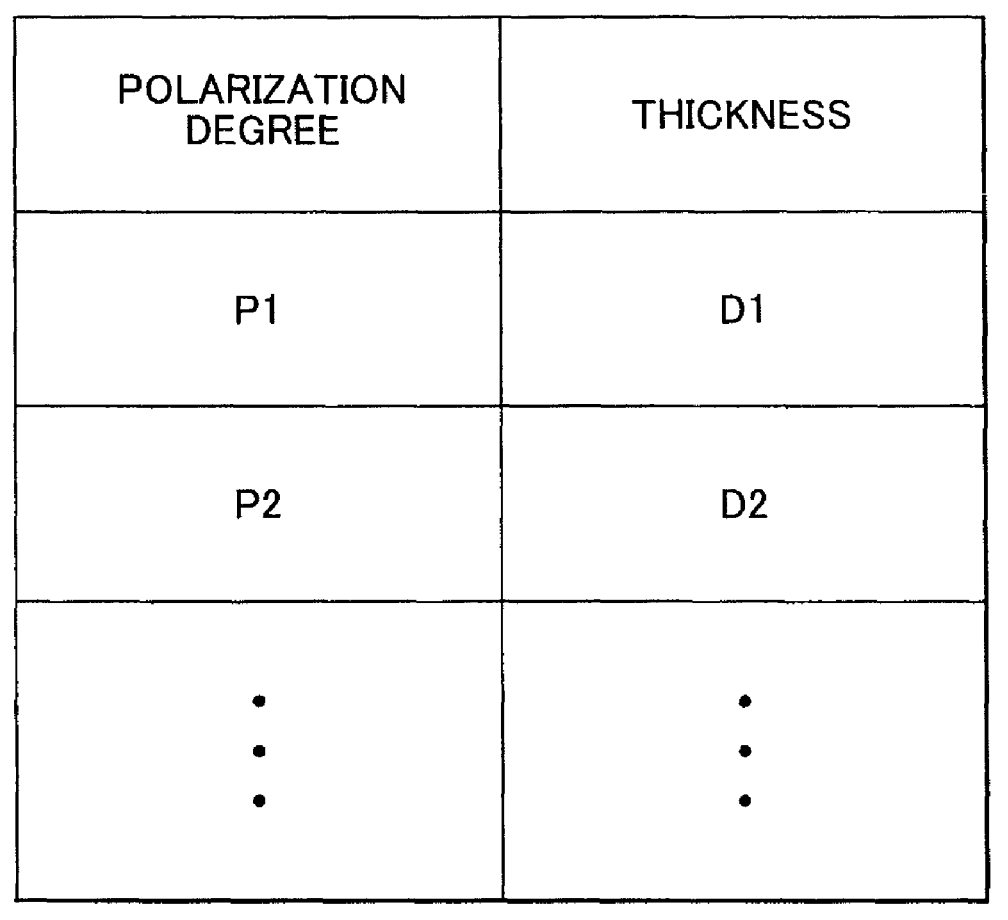

FIG. 9 is an exemplary table showing thickness information stored by the thickness calculating section 460. The thickness calculating section 460 stores thicknesses of the scattering medium, in advance, in association with polarization degrees. The thickness calculating section 460 calculates the thickness of the scattering medium to be the thickness stored in association with the polarization degree of the light received by the light receiving section 240.

The thickness information calculated by the thickness calculating section 460 may be supplied to the image generating section 400. The polarization characteristic calculating section 440 can calculate the polarization degree across a certain area of the organism 190 as described above, and therefore the depth calculating section 460 can calculate the thickness across a certain area of the organism 190. Accordingly, the image generating section 400 may use the depth information calculated by the depth calculating section 460 to generate the image indicating the thickness of the scattering layer. For example, the image generating section 400 may generate the image by modulating the brightness information of the image of the organism 190 obtained by the endoscope 100 with the thickness information concerning the scattering layer. In this way, the optical system 10 can easily display an image indicating the depth of the scattering layer.

Figure 10:
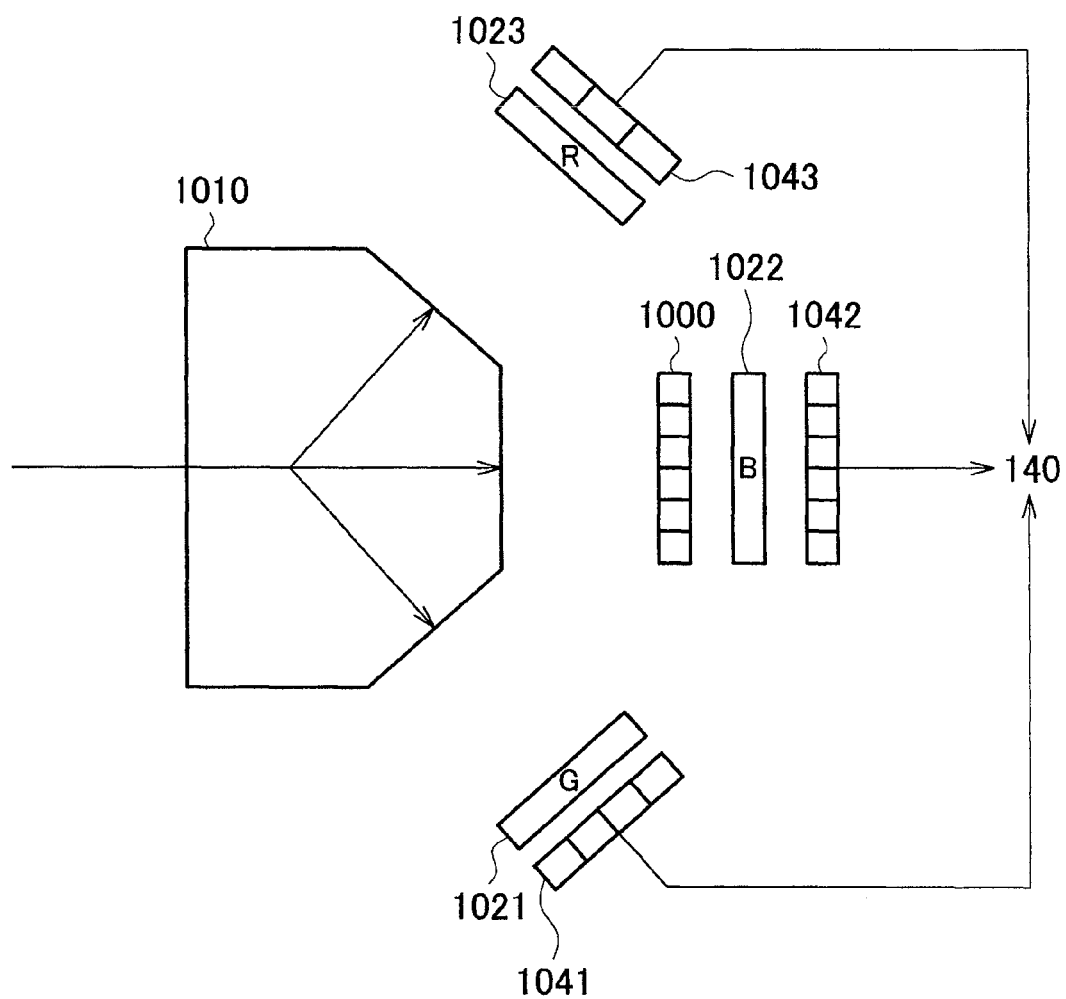
FIG. 10 shows another exemplary configuration of the image capturing section 110.

FIG. 10 shows another exemplary configuration of the image capturing section 110. In this example, the image capturing section 110 has a so-called three-plate configuration.

The image capturing section 110 includes an optical array 1010 that disperses reflected light, a color filter 1021 that transmits a green light component, a color filter 1022 that transmits a blue light component, a color filter 1023 that transmits a red light component, a light receiving element array 1041 that receives the green light component, a light receiving element array 1042 that receives the blue light component, a light receiving element array 1043 that receives the red light component, and a polarization filter 1000. The optical array 1010 includes the lens 112 and disperses the reflected light from the organism 190 to the light receiving element arrays 1041, 1042, and 1043.

The light receiving element array 1041 receives the green component light dispersed by the optical array 1010 and transmitted by the color filter 1021. The light receiving element array 1043 receives the red component light dispersed by the optical array 1010 and transmitted by the color filter 1023. The light receiving element array 1042 receives the blue component light dispersed by the optical array 1010 and transmitted by the polarization filter 1000 and the color filter 1022.

The light receiving element arrays 1041, 1042, and 1043 are each formed by arranging a plurality of light receiving elements on substantially the same plane. As shown in FIG. 10, the light receiving elements are arranged with higher surface density in the light receiving element array 1042 than in the light receiving element arrays 1041 and 1043. The polarization filter 1000 is formed by arranging polarizing elements that transmit light with different polarization characteristics in a matrix formation on substantially the same plane, in the same manner as the polarization filter 200. The image capturing section 110 having a multi-plate configuration, as shown in FIG. 10, can measure the polarization information at a high resolution by causing the light receiving element array in which the light receiving elements are arranged at a higher surface density to receive the light polarized in a different direction.

In the embodiment described above, the light receiving elements that receive the blue light component are arranged with the highest surface density, but in other embodiments, the light receiving elements that receive the green light component may be arranged with the highest surface density. In this case, the light receiving elements that receive the green light component receive the light polarized in a different direction.

In the above embodiment, the light receiving elements arranged with the highest density receive the different polarized light component. Since the optical intensity drops when transmitted by the polarization filter 200, in other embodiments, the light receiving elements that receive the color component light expected to be received with the highest intensity may receive the light polarized in a different direction.

In other words, in the light receiving section 240, the second light receiving elements 242 may receive the second color component light, which has an optical intensity greater than the first color component light, from the organism 190. For example, the second light receiving elements 242 may receive the red component light from the organism 190, and the first light receiving elements 241 and the third light receiving elements 243 may receive color component light other than the red component from the organism 190. For example, the first light receiving elements 241 may receive the green component light or the blue component light. The color components are not limited to red, green, and blue, and may include complementary color components.

When the first light receiving elements 241 and the second light receiving elements 242 receive the light that is radiated by the light radiating section 120 and reflected from the organism 190, the light reflectance of the organism 190 in the wavelength region of the light received by the second light receiving elements 242 may be greater than the light reflectance of the organism 190 in the wavelength region of the light received by the first light receiving elements 241. Furthermore, (i) a value obtained by multiplying the reflectance in the wavelength region of the light received by the second light receiving elements 242 by the light receiving sensitivity of the second light receiving elements 242 may be greater than (ii) a value obtained by multiplying the reflectance in the wavelength region of the light received by the first light receiving elements 241 by the light receiving sensitivity of the first light receiving elements 241. The light receiving surface area of the second light receiving elements 242 may be greater than the light receiving area of the first light receiving elements 241.

Figure 11:
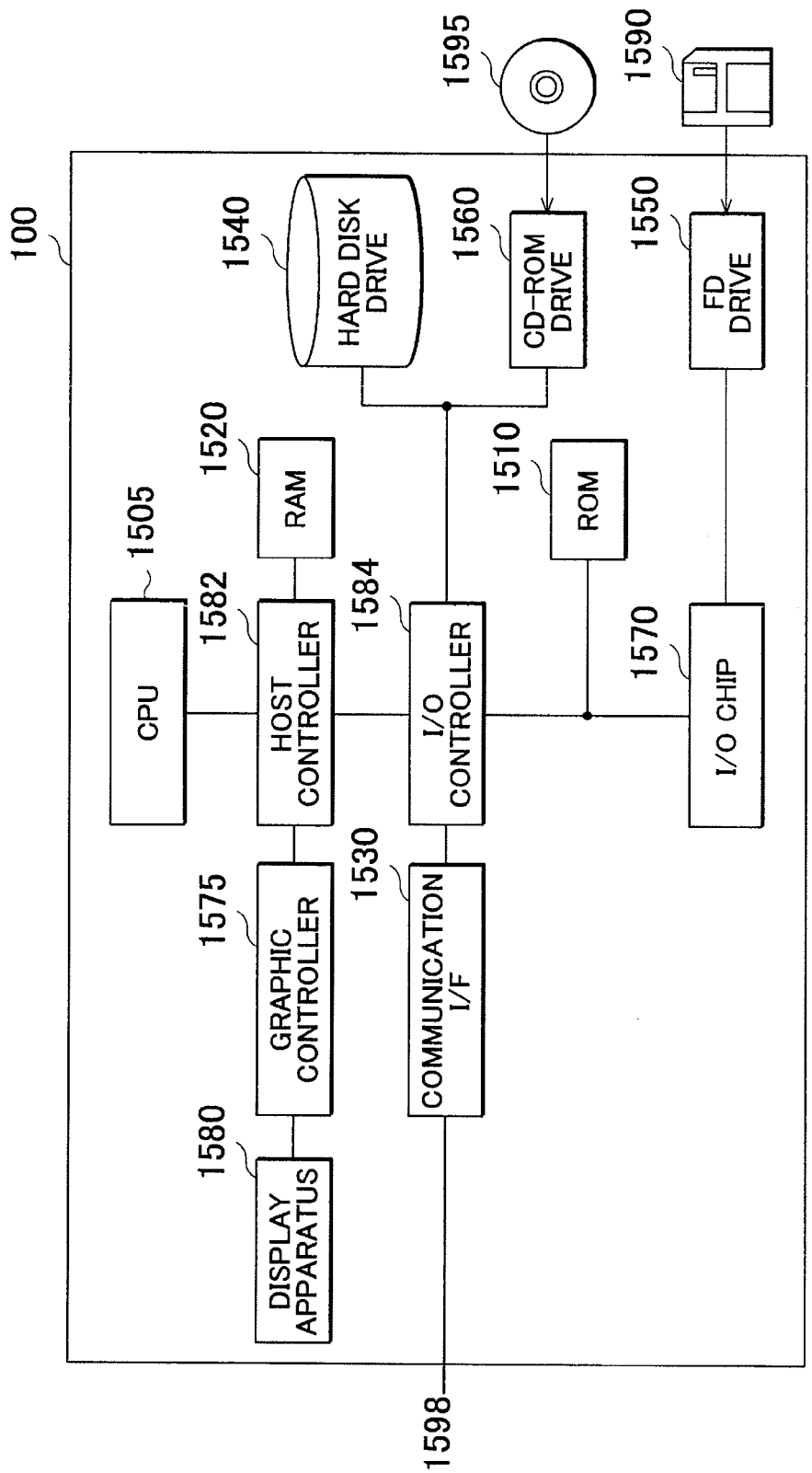
FIG. 11 shows an exemplary hardware configuration of the optical system 10 according to the present embodiment.

FIG. 11 shows an exemplary hardware configuration of the optical system 10 according to the present embodiment. The optical system 10 according to the present embodiment is provided with a CPU peripheral section that includes a CPU 1505, a RAM 1520, a graphic controller 1575, and a display apparatus 1580 connected to each other by a host controller 1582; an input/output section that includes a communication interface 1530, a hard disk drive 1540, and a CD-ROM drive 1560, all of which are connected to the host controller 1582 by an input/output controller 1584; and a legacy input/output section that includes a ROM 1510, a flexible disk drive 1550, and an input/output chip 1570, all of which are connected to the input/output controller 1584.

The host controller 1582 is connected to the RAM 1520 and is also connected to the CPU 1505 and graphic controller 1575 accessing the RAM 1520 at a high transfer rate. The CPU 1505 operates to control each section based on programs stored in the ROM 1510 and the RAM 1520. The graphic controller 1575 acquires frame image data generated by the CPU 1505 or the like on a frame buffer disposed inside the RAM 1520 and displays the frame image data in the display apparatus 1580. In addition, the graphic controller 1575 may internally include the frame buffer storing the frame image data generated by the CPU 1505 or the like.

The input/output controller 1584 connects the hard disk drive 1540, the communication interface 1530 serving as a relatively high speed input/output apparatus, and the CD-ROM drive 1560 to the host controller 1582. The communication interface 1530 communicates with other apparatuses via the network. The hard disk drive 1540 stores the programs used by the CPU 1505 in the optical system 10. The CD-ROM drive 1560 reads the programs and data from a CD-ROM 1595 and provides the read information to the hard disk drive 1540 via the RAM 1520.

Furthermore, the input/output controller 1584 is connected to the ROM 1510, and is also connected to the flexible disk drive 1550 and the input/output chip 1570 serving as a relatively high speed input/output apparatus. The ROM 1510 stores a boot program performed when the optical system 10 starts up, a program relying on the hardware of the optical system 10, and the like. The flexible disk drive 1550 reads programs or data from a flexible disk 1590 and supplies the read information to the communication interface 1530 and the hard disk drive 1540 and via the RAM 1520. The input/ output chip 1570 connects the flexible disk drive 1550 to each of the input/output apparatuses via, for example, a parallel port, a serial port, a keyboard port, a mouse port, or the like.

The programs performed by the CPU 1505 are stored on a recording medium such as the flexible disk 1590, the CD-ROM 1595, or an IC card and are provided by the user. These programs may be compressed or uncompressed. The programs are installed from the recording medium onto the hard disk drive 1540, and read by the RAM 1520 to be executed by the CPU 1505. The programs executed by the CPU 1505 cause the optical system 10 to function as each component of the optical system 10 described in relation to FIGS. 1 to 10.

The programs shown above may also be stored in an external storage medium. The flexible disk 1590, the CD-ROM 1595, an optical storage medium such as a DVD or CD, a magneto-optical storage medium, a tape medium, a semiconductor memory such as an IC card, or the like can be used as the storage medium. Furthermore, a storage apparatus such as a hard disk or RAM that is provided with a server system connected to the Internet or a specialized communication network may be used to provide the programs to the optical system 10 via the network. In this way, a computer controlled by the programs can function as the optical system 10.

While the embodiments of the present invention have been described, the technical scope of the invention is not limited to the above described embodiments. It is apparent to persons skilled in the art that various alterations and improvements can be added to the above-described embodiments. It is also apparent from the scope of the claims that the embodiments added with such alterations or improvements can be included in the technical scope of the invention.

What is claimed is:

1. An image capturing apparatus comprising:
a plurality of first light receiving elements that are arranged on substantially the same plane and that each receive light of a first color component from a subject;
a plurality of second light receiving elements that are arranged on substantially the same plane and with a higher surface density than the plurality of first light receiving elements, and that each receive light of a second color component from the subject; and
a polarizing section that (i) blocks polarized light components from the subject except for a first polarized light component so that first-polarized-light receiving elements, which are a portion of the plurality of second light receiving elements, receive the first polarized light component from the subject, and (ii) transmits the light from the subject to be received by the plurality of first light receiving elements.

2. The image capturing apparatus according to claim 1, wherein
the polarizing section blocks polarized light components from the subject except for a second polarized light component so that second-polarized-light receiving elements, which are a portion of the plurality of second light receiving elements, receive the second polarized light component from the subject.

3. The image capturing apparatus according to claim 2, wherein
the plurality of first light receiving elements and the plurality of second light receiving elements are arranged on substantially the same plane.

4. The image capturing apparatus according to claim 3, further comprising a plurality of third light receiving elements that are arranged on substantially the same plane and that each receive light of a third color component from the subject, wherein
the plurality of second light receiving elements are arranged with a surface density higher than that of the plurality of third light receiving elements.

5. The image capturing apparatus according to claim 3, wherein
the second light receiving elements receive green component light from the subject.

6. The image capturing apparatus according to claim 3, wherein
the plurality of second light receiving elements receive blue component light from the subject, which is an organism.

7. The image capturing apparatus according to claim 3, wherein
the first polarized light component and the second polarized light component have polarization directions that are different from each other.

8. The image capturing apparatus according to claim 7, wherein
the first polarized light component and the second polarized light component have polarization directions that are substantially perpendicular to each other.

9. The image capturing apparatus according to claim 3, wherein
the first polarized light component and the second polarized light component have polarization directions that are substantially perpendicular to each other.

10. The image capturing apparatus according to claim 9, further comprising:
an optical intensity calculating section that calculates an optical intensity of the second color component from the subject based on (i) the amount of the first polarized light component received by the first-polarized-light receiving elements and (ii) the amount of the second polarized light component received by the second-polarized-light receiving elements; and
an image generating section that generates an image of the subject based on the optical intensity calculated by the optical intensity calculating section and the amount of light received by the plurality of first light receiving elements.

11. The image capturing apparatus according to claim 3, wherein
the polarizing section blocks polarized light components from the subject except for a third polarized light component so that third-polarized-light receiving elements, which are a portion of the plurality of second light receiving elements, receive the third polarized light component from the subject.

12. The image capturing apparatus according to claim 11, wherein
the first polarized light component, the second polarized light component, and the third polarized light component each have a polarization direction that differs from the polarization directions of the others.

13. The image capturing apparatus according to claim 12, further comprising a polarization characteristic calculating section that calculates a polarization characteristic of the light from the subject based on (i) an amount of the first polarized light component received by the first-polarized-light receiving elements, (ii) an amount of the second polarized light component received by the second-polarized-light receiving elements, and (iii) an amount of the third polarized light component received by the third-polarized-light receiving elements.

14. The image capturing apparatus according to claim 13, wherein the polarizing section (i) causes the plurality of first-polarized-light receiving elements to receive the first polarized light component from the subject, (ii) causes the plurality of second-polarized-light receiving elements to receive the second polarized light component from the subject, and (iii) causes the plurality of third-polarized-light receiving elements to receive the third polarized light component from the subject, and the polarization characteristic calculating section calculates a spatial distribution of the polarization characteristic of the light from the subject based on (i) an amount of the first polarized light component received by each of the first-polarized-light receiving elements, (ii) an amount of the second polarized light component received by each of the second-polarized-light receiving elements, and (iii) an amount of the third polarized light component received by each of the third-polarized-light receiving elements.

15. The image capturing apparatus according to claim 12, further comprising a light radiating section that irradiates the subject with light, wherein the polarizing section (i) causes the plurality of first-polarized-light receiving elements to receive the first polarized light component in reflected light, which is light radiated by the light radiating section and reflected back from the subject, (ii) causes the plurality of second-polarized-light receiving elements to receive the second polarized light component in the reflected light, and (iii) causes the plurality of third-polarized-light receiving elements to receive the third polarized light component in the reflected light.

16. The image capturing apparatus according to claim 15, wherein the light radiating section irradiates the subject with circularly polarized light that includes the light of the second color component, wherein the image capturing apparatus further comprises:

a polarization characteristic calculating section that calculates a polarization direction of the light from the subject based on (i) an amount of the first polarized light component received by the first-polarized-light receiving elements, (ii) an amount of the second polarized light component received by the second-polarized-light receiving elements, and (iii) an amount of the third polarized light component received by the third-polarized-light receiving elements; and a gradient calculating section that calculates a gradient of a surface of the subject based on the polarization direction calculated by the polarization characteristic calculating section.

17. The image capturing apparatus according to claim 15, wherein the polarizing section includes:

a plurality of first polarizing elements that block light in the reflected light except for the first polarized light component, so that each of the plurality of first-polarized-light receiving elements receive the first polarized light component in the reflected light;

a plurality of second polarizing elements that block light in the reflected light except for the second polarized light component, so that each of the plurality of second-polarized-light receiving elements receive the second polarized light component in the reflected light; and a plurality of third polarizing elements that block light in the reflected light except for the third polarized light component, so that each of the plurality of third-polarized-light receiving elements receive the third polarized light component in the reflected light.

18. The image capturing apparatus according to claim 17, wherein the plurality of first polarizing elements, the plurality of second polarizing elements, and the plurality of third polarizing elements are formed on substantially the same plane.

19. An image capturing apparatus comprising:

a plurality of first light receiving elements that are arranged on substantially the same plane and that each receive light of a first color component from a subject;

a plurality of second light receiving elements that are arranged on substantially the same plane and that each receive light of a second color component from the subject, the second color component having an optical intensity greater than that of the first color component; and a polarizing section that blocks polarized light components from the subject except for a first polarized light component so that first-polarized-light receiving elements, which are a portion of the plurality of second light receiving elements, receive the first polarized light component from the subject.

20. The image capturing apparatus according to claim 19, further comprising a light radiating section that irradiates the subject with light, wherein the plurality of first light receiving elements and the plurality of second light receiving elements receive light that is radiated by the light radiating section and reflected from the subject, and light reflectance of the subject in a wavelength region of the light received by the plurality of second light receiving elements is greater than the light reflectance of the subject in a wavelength region of the light received by the plurality of first light receiving elements.

21. The image capturing apparatus according to claim 20, wherein a value obtained by multiplying (i) the light reflectance in the wavelength region of the light received by the plurality of second light receiving elements by (ii) a light receiving sensitivity of the plurality of second light receiving elements, is greater than a value obtained by multiplying (iii) the light reflectance in the wavelength region of the light received by the plurality of first light receiving elements by (iv) the light receiving sensitivity of the plurality of first light receiving elements.

22. The image capturing apparatus according to claim 20, wherein a light receiving surface area of the plurality of second light receiving elements is greater than the light receiving surface area of the plurality of first light receiving elements.

23. The image capturing apparatus according to claim 20, wherein the plurality of second light receiving elements receive red component light from the subject, which is an organism, and the plurality of first light receiving elements receive light of color components other than the red component from the subject.

24. An image capturing apparatus comprising:

a plurality of first light receiving elements that are arranged on substantially the same plane and that each receive light of a first color component from a subject;

a plurality of second light receiving elements that are arranged on substantially the same plane and that each receive light of a second color component from the subject; and a polarizing section that blocks polarized light components from the subject except for a first polarized light component so that first-polarized-light receiving elements, which are a portion of the plurality of second light receiving elements, receive the first polarized light component from the subject.

25. An image capturing method comprising:

receiving light of a first color component from a subject using a plurality of first light receiving elements arranged on substantially the same plane;

receiving light of a second color component from a subject using a plurality of second light receiving elements arranged on substantially the same plane; and blocking polarized light components from the subject except for a first polarized light component, so that the first polarized light component from the subject is received by first-polarized-light receiving elements, which are a portion of the plurality of second light receiving elements.

* * * * *